US012433388B2

(12) United States Patent
Leroux

(10) Patent No.: US 12,433,388 B2
(45) Date of Patent: Oct. 7, 2025

(54) ASSEMBLY FOR PACKAGING A COSMETIC PRODUCT, COMPRISING A DRAWN GLASS BOTTLE AND A WIPING MEMBER SNAP-FASTENED IN THE NECK OF THE BOTTLE

(71) Applicant: L'Oreal, Paris (FR)

(72) Inventor: Stéphane Leroux, Chevilly-Larue (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 18/715,187

(22) PCT Filed: Nov. 17, 2022

(86) PCT No.: PCT/EP2022/082240
§ 371 (c)(1),
(2) Date: May 31, 2024

(87) PCT Pub. No.: WO2023/099229
PCT Pub. Date: Jun. 8, 2023

(65) Prior Publication Data

US 2025/0040682 A1 Feb. 6, 2025

(30) Foreign Application Priority Data

Dec. 3, 2021 (FR) ....................................... 2112903

(51) Int. Cl.
*A46B 17/08* (2006.01)
*A45D 34/00* (2006.01)
(Continued)

(52) U.S. Cl.
CPC ........... *A45D 34/00* (2013.01); *A45D 34/042* (2013.01); *A45D 34/045* (2013.01);
(Continued)

(58) Field of Classification Search
CPC .. A45D 34/042; A45D 34/045; A45D 34/046; A45D 40/262; A45D 40/265; A45D 40/267; A45D 2200/05
(Continued)

(56) References Cited

U.S. PATENT DOCUMENTS 7,044,669 B2 * 5/2006 Winckels ............ A45D 34/046 401/122
7,914,220 B2 3/2011 Neuner et al.
(Continued)

FOREIGN PATENT DOCUMENTS

FR 3079397 A1 * 10/2019 ........... A45D 34/045
FR 3 090 292 6/2020

OTHER PUBLICATIONS

International Search Report and Written Opinion for PCT/EP2022/082240, mailed Jun. 8, 2023.

*Primary Examiner* — Jennifer C Chiang
(74) *Attorney, Agent, or Firm* — CHRISTENSEN O'CONNOR JOHNSON KINDNESS PLLC

(57) ABSTRACT

An assembly for packaging a cosmetic product, comprising a glass bottle extending between a bottom and a neck, and a wiping member, wherein the bottle is made of drawn glass and wherein the neck has an annular groove in the outer surface of the neck and also an annular bulge on the inner surface of the neck, wherein the annular bulge cooperates with a groove in the wiping member in order to ensure that the wiping member is fastened inside the neck by snap-fastening.

15 Claims, 4 Drawing Sheets

(51) Int. Cl.

| | |
|---|---|
| ***A45D 34/04*** | (2006.01) |
| ***A45D 40/26*** | (2006.01) |
| ***C03B 23/047*** | (2006.01) |
| ***C03B 23/09*** | (2006.01) |

(52) U.S. Cl.
CPC ......... *A45D 34/046* (2013.01); *A45D 40/262* (2013.01); *A45D 40/265* (2013.01); *A45D 40/267* (2013.01); *C03B 23/047* (2013.01); *C03B 23/092* (2013.01); *A45D 2034/002* (2013.01); *A45D 2200/05* (2013.01); *A45D 2200/25* (2013.01)

(58) Field of Classification Search
USPC .......................................................... 401/121
See application file for complete search history.

(56) References Cited

U.S. PATENT DOCUMENTS

2014/0016983 A1* 1/2014 Kim ..................... A45D 40/268
401/122
2019/0133297 A1 5/2019 Moretti

* cited by examiner

ASSEMBLY FOR PACKAGING A COSMETIC PRODUCT, COMPRISING A DRAWN GLASS BOTTLE AND A WIPING MEMBER SNAP-FASTENED IN THE NECK OF THE BOTTLE

CROSS-REFERENCE TO RELATED APPLICATIONS

This application is a U.S. National Stage Application of PCT/EP2022/082240, filed Nov. 17, 2022, which claims the benefit of FR2112903, filed Dec. 3, 2021, the disclosures of which are incorporated herein in their entirety.

The present invention relates to an assembly for packaging a cosmetic product, comprising a bottle made of glass and a wiping member with which this bottle is equipped.

The production of cosmetic product containers in the form of glass bottles is part of a current tendency to replace the use of plastics materials with materials that are more durable over time and do not make use of raw materials derived from petrochemicals, in order to limit the environmental impact caused by the use of such raw materials, in particular during the production and at the end of life of the container.

Various techniques may be envisaged to produce such glass bottles. Among these, mention may be made of the main techniques of industrial manufacture by blowing, pressing or a combination of these two techniques, in which a mould is used; this is referred to as blow-moulding.

Conventionally, when a bottle of cosmetic product, and in particular of product for making up the eyelashes and/or eyebrows, or the lips, is intended to be combined with an applicator comprising a gripping element, an applicator member and a stem connecting these two elements, a wiping member is fastened in the neck of the bottle in order to scrape the stem and "wipe" the applicator member when the applicator is withdrawn from the bottle, in order to clean the stem and remove excess product loaded on the applicator member.

To this end, the wiping member needs to be fastened reliably in the neck, in order in particular to prevent it from dropping into the bottle when the applicator member is introduced into it and/or to prevent it from being removed from the bottle when the applicator member leaving the bottle passes through it.

When the bottle is made of plastics material, one or more grooves are generally formed in the inner surface of the neck of the bottle and are intended to accommodate one or more complementary beads formed on the outer surface of the wiping member in order to retain the wiping member in the neck of the bottle.

However, when the bottle is made of glass via one or the other of the abovementioned techniques, it is particularly difficult, if not impossible to provide, on the inner surface of the neck of the bottle, such a groove designed to cooperate with a bead that is provided on the outer surface of the wiping member and makes it possible to keep the wiping member inside the neck of the bottle. This is because the abovementioned usual processes for manufacturing glass bottles employ a blowing needle introduced into the neck of the bottle in order to shape the bottle, requiring airtight contact between the needle and the inner surface of the neck of the bottle. Since the blowing needle has a smooth outer surface, the need for tightness with the neck of the bottle means that the inner surface of the latter also has to be smooth and devoid of any recessed or protruding relief. Furthermore, such a groove provided in the neck of the bottle would make it impossible to demould the latter, in particular by force, since glass has only a very low capacity for elastic deformation.

Thus, and conventionally, when the bottle is made of glass, the wiping member is force-fitted into the neck of the bottle, a cylindrical outer surface of the wiping member being in tightened or close contact, in the assembled position, with a cylindrical inner surface of the neck of the bottle in order to keep the wiping member inside the neck along the longitudinal axis of the bottle.

However, such force-fitting of the wiping member inside the neck of the bottle is not entirely satisfactory in terms of reliability and robustness of fastening, this being in particular directly dependent on the manufacturing tolerances of the bottle and of the wiping member, dimensional variations being likely to result in insufficient clamping or, by contrast, excessive clamping of the wiping member inside the neck of the bottle. Insufficient clamping would entail a risk of the wiping member sinking into the bottle when the applicator member is introduced into the latter and/or a risk of the wiping member being extracted from the bottle when it is passed through by the applicator member leaving the bottle. Such insufficient clamping may also result from the shaping of the wiping member over time. On the other hand, excessive clamping of the wiping member inside the neck of the bottle would be likely to result in incomplete insertion of the wiping member into the neck of the bottle during assembly in the factory, the wiping member then protruding at least slightly from the opening defined by the neck of the bottle and impairing the tightness of the bottle when the latter is combined with a closure member. This problem is all the more critical when the bottle is made of glass, the manufacturing tolerances of such a bottle in the region of its neck being relatively high, in particular compared with a bottle made of plastics material.

The document FR3090292, in the name of the Applicant, provides a solution to this problem of reliability and robustness of the fastening of a wiping member inside the neck of a bottle made of glass, by proposing a wiping member provided with a collar for bearing on the mouth of the neck, making it possible to avoid the sinking of the wiping member into the bottle during the insertion of an applicator member into the bottle through the wiping member, and with a system of retaining harpoons or barbed hooks that are adapted to open out behind the shoulder of the bottle in order to prevent the withdrawal of the wiping member from the bottle when it is passed through the applicator member leaving the bottle. The wiping member described in that document FR3090292 is advantageously provided with a openwork portion that is axially extendable during the fitting of the wiping member in the neck of the bottle, making it possible to ensure proper opening out of the harpoons behind the shoulder of the bottle, in spite of the dimensional variations in the length of the neck of the bottle that are caused in particular by its being manufactured from glass.

Although providing an effective solution to the abovementioned problems, the wiping member according to that document FR3090292 is not entirely satisfactory. This is because, to remedy these problems, the document FR3090292 proposes a wiping member with a relatively complex structure, requiring the implementation of a bearing collar, of a system of retaining harpoons and of an extendable openwork portion interposed between the collar and the harpoons, meaning that its manufacture is associated with certain constraints and entailing relatively high production costs. Furthermore, the two-step fitting of the wiping member according to that document FR3090292 makes its assembly in the neck of the bottle relatively complex industrially.

The present invention aims to remedy all or some of these drawbacks and, to this end, proposes an assembly for packaging cosmetic product, comprising a glass bottle which is adapted to receive a cosmetic product, in particular a makeup product, and extends along a longitudinal axis between a first end and a neck defining an opening for accessing the interior of the bottle, said bottle having a side wall extending between said first end and said neck, being connected to the latter via a shoulder, said neck having a circular cross section and defining an outer surface and an inner surface, and a wiping member comprising a fastening portion of circular cross section, having an inner surface defining an introduction orifice and an outer surface for fastening inside the neck of the bottle, and a wiping portion defining a wiping orifice on the opposite side from the introduction orifice along the longitudinal axis. According to the invention, the bottle is made of drawn glass and the inner surface of the neck has an annular bulge that extends inwardly in a radial direction perpendicular to the longitudinal axis, that is obtained by circular deformation of the outer surface of said neck and that cooperates with an annular groove formed in the outer surface of the wiping member in order to ensure that the wiping member is fastened inside the neck by snap-fastening.

The first end of the glass bottle may advantageously be closed and form a bottom integral with the side wall and the neck. In a variant, the first end of the glass bottle may be open and closed by at least one attached stopper, for example made of plastics material, that is fastened to the first end of the glass bottle by any known means, so as to form the bottom of the bottle. For example, such an attached stopper may be force-fitted into or around the first end of the glass bottle. In a variant, provision may be made for the attached stopper and the first end of the glass bottle to be provided with complementary fastening elements adapted to cooperate in order for the stopper to be assembled on the open first end of the glass bottle, such as an external and internal thread system or complementary snap-fastening reliefs.

The present invention thus implements a technique of manufacturing glass bottles involving a process of blowing combined with drawing; the term drawn glass is then used. Such a process for manufacturing drawn glass has advantages compared with blow-moulding techniques, in particular in terms of manufacturing rates and costs, this being carried out continuously, and in terms of a reduction in mass of the bottles thus obtained, this process making it possible in particular to easily produce tubular bottles of reduced thickness. Furthermore, this glass bottle production technique affords the possibility of easily and inexpensively shaping a bottle parison obtained during a first manufacturing phase and having, for example, the shape of an open-ended tube, or glass rod, which is typically cylindrical and generally has a circular cross section, by hot deformation of this tubular parison during a second manufacturing phase, or shaping phase, in particular shaping the neck of the bottle and, where appropriate, forming the bottom of the bottle integral with the side wall or forming, at the first open end of the bottle, fastening means intended to cooperate with an attached stopper. In particular, the circular deformation of the outer surface of the neck of the bottle, which brings about the formation of the annular bulge on the inner surface of the neck of the bottle, provided for the snap-fastening of the wiping member, is produced easily and inexpensively during such a phase of shaping the tubular parison by hot deformation, simultaneously with or following the hot shaping of the bottle neck. Furthermore, during this phase of shaping the tubular parison by hot deformation, it is also possible to shape the side wall of the bottle such that it adopts a cross section of constant or variable shape and size along the longitudinal axis. In particular, during this phase of shaping the tubular parison by hot deformation, it is possible to shape the side wall of the bottle such that it adopts a cylindrical shape, in particular of circular cross section with a desired diameter, optionally different from and in particular smaller than that of the tubular parison obtained at the end of the first manufacturing phase. In a variant, during this phase of shaping the tubular parison by hot deformation, it is possible to shape the side wall of the bottle such that it adopts a cylindrical shape, but with a cross section other than circular, for example a cross section that is rectangular, square, square with rounded edges, a squircle shape, ovoid or the like. According to yet another variant, the tubular parison or glass rod produced during the first manufacturing phase may directly have a cross section other than circular, for example a cross section that is rectangular, square, square with rounded edges, a squircle shape, ovoid or the like. During the shaping phase, it is also possible to form, on the side wall of the bottle, reliefs that are decorative or intended to improve the gripping of the bottle, such as ridges or waves. Regardless of the shape conferred on the cross section of the side wall of the bottle, which is directly obtained at the end of the first manufacturing phase or created during the subsequent shaping phase, the neck of the bottle has a circular cross section so that it is possible to form, on the inner surface of said neck, the annular bulge provided for the snap-fastening of the wiping member by circular deformation of the outer surface of the neck of the bottle.

Furthermore, by virtue of these provisions, the invention provides an assembly in which the fastening of the wiping member in the neck of the bottle has improved reliability and robustness, by cooperation of snap-fastening reliefs provided on the neck of the bottle and on the wiping member, without requiring a structure that is particularly complex and expensive to produce for the wiping member and/or for the glass bottle. Moreover, the snap-fastening of the wiping member in the neck of the bottle implemented within the assembly according to the invention is particularly quick and easy to carry out during assembly operations carried out on the industrial scale. In addition, the snap-fastening, also referred to as elastic push-fitting, allows a certain dimensional variation of the assembled elements, this fastening technique being based on the capacity for deformation and elastic return of at least one of the assembled elements.

The access opening, typically circular, defined by the neck of the bottle has a first diameter, the introduction orifice, typically circular, defined by the fastening portion of the wiping member has a second diameter, and the wiping orifice, typically circular, defined by the wiping portion of the wiping member has a third diameter. The second diameter defined by the introduction orifice of the wiping member is preferably smaller than the first diameter defined by the access opening of the bottle. The third diameter defined by the wiping orifice is preferably smaller than the second diameter defined by the introduction orifice.

Advantageously, the bottle has a wall thickness that is substantially constant along its entire length along the longitudinal axis.

Preferably, the annular bulge protrudes in the radial direction from the inner surface of the neck by a distance greater than or equal to 0.3 mm, and preferably greater than or equal to 0.4 mm. These provisions ensure that there is a relief on the inner surface of the bottle neck, provided to be accommodated in the groove formed in the outer surface of the fastening portion of the wiping member, having a dimension that is sufficient in the radial direction to reliably retain the wiping member in the neck of the bottle along the longitudinal axis.

According to another preferred provision, the annular bulge extends over a height along the longitudinal axis greater than or equal to 1 mm, and preferably greater than or equal to 2 mm. These provisions ensure that there is a relief on the inner surface of the bottle neck, provided to be accommodated in the groove formed in the outer surface of the fastening portion of the wiping member, having a dimension that is sufficient in the axial direction to reliably retain the wiping member in the neck of the bottle along the longitudinal axis.

According to one advantageous provision, in addition to the snap-fastening of the annular groove present on the outer surface of the fastening portion of the wiping member over the annular bulge formed on the inner surface of the neck of the bottle, provision may also be made of tightened or close contact in the radial direction between the neck of the bottle and the wiping member, and in particular between the inner surface of the neck of the bottle and the outer surface of the fastening portion of the wiping member. In particular, tightened contact in the radial direction is advantageously provided between the inner surface of the neck of the bottle and an upper part of the outer surface of the fastening portion of the wiping member, said portion being situated axially between the introduction orifice and the annular groove. In a variant or in addition, tightened contact in the radial direction may also be provided between the inner surface of the neck of the bottle and a lower part of the outer surface of the fastening portion of the wiping member, said portion being situated axially between the annular groove and the wiping portion. In one particular embodiment, tightened contact in the radial direction is advantageously provided between the inner surface of the neck of the bottle and the upper part of the outer surface of the fastening portion of the wiping member, said portion being situated axially between the introduction orifice and the annular groove, and a clearance in the radial direction is left between the inner surface of the neck of the bottle and the lower part of the outer surface of the fastening portion of the wiping member, said portion being situated axially between the annular groove and the wiping portion.

Advantageously, the fastening portion of the wiping member has a collar bearing on the mouth of the neck of the bottle and defining the introduction orifice situated above the opening of the neck of the bottle along the longitudinal axis. The retention of the wiping member in the neck of the bottle along the longitudinal axis in the direction of insertion towards the bottom of the bottle is thus reinforced, by the hard stop contact formed between the collar of the fastening portion of the wiping member and the mouth of the neck of the bottle, the latter being formed by the frontal surface of the neck of the bottle situated on the opposite side from the bottom along the longitudinal axis.

In a variant, the fastening portion of the wiping member does not have a collar bearing on the mouth of the neck of the bottle and defines an introduction opening situated below the opening of the neck of the bottle along the longitudinal axis. By virtue of these provisions, the fouling of the bottle is limited during the introduction of an applicator member into the bottle through the wiping member. This is because, by virtue of this wiping member structure and the arrangement thereof inside the neck of the bottle, when an applicator member is introduced into the bottle through the wiping member, it is inserted into the wiping member through the introduction orifice situated axially below the opening defined by the neck of the bottle, that is to say set back in the direction of the bottom of the bottle with respect to the opening of the bottle defined by the frontal surface, or mouth, of the neck. This limits the risk of the product remaining on the applicator member fouling the region situated at the mouth of the neck of the bottle when the applicator member is reinserted into the bottle following an application of product, in particular when the applicator member has a diameter similar to that of the access opening of the bottle. It is thus advantageously possible to join to the assembly formed by a bottle and such a wiping member a cosmetic product applicator provided with an applicator member having a large diameter, in particular similar to the diameter of the access opening of the bottle, limiting the risk of soiling and fouling of the mouth of the neck of the bottle during the reinsertion of the applicator member into the bottle following application of product. Such a wiper that does not have a bearing collar is the subject of a French patent application in the name of the Applicant, under the application number FR2008674 (application not published to date).

Preferably, the wiping portion of the wiping member has a wiping lip that extends inwardly in the radial direction and defines the wiping orifice.

In particular, the wiping lip is in the form of a cone frustum, the small base of which defines the wiping orifice.

In a variant or in addition, provision may be made for the wiping lip to have waves about the longitudinal axis.

According to an advantageous provision, the assembly comprising a bottle and a wiping member as defined above also comprises a closure element adapted to cooperate with the neck of the bottle in order to close the opening thereof. The assembly thus formed, wherein the bottle is, where appropriate, provided with a stopper for closing its first end, advantageously constitutes an autonomous assembly for packaging cosmetic product, making it possible to contain a cosmetic product inside the bottle, preferably in a leaktight manner. Such an assembly may, for example, advantageously form a cosmetic product refill which, following removal of the closure element, will replace an assembly comprising a bottle and a wiping member in which the cosmetic product that it contains has been, entirely or partially, used up.

In order to ensure that the closure element is fastened to the neck of the bottle, the neck of the bottle and the closure element are provided with complementary fastening elements, such as an external thread and an internal thread.

Preferably, when the closure element closes the opening of the neck of the bottle, the outer surface of said closure element is flush with or set back from the outer surface of the side wall of the bottle in the radial direction. The assembly formed by the bottle, the wiping member and the closure element thus does not have a relief protruding in the radial direction, which could in particular catch on an object exterior to the assembly, for example the interior of a bag or during the transport of the assembly, which would risk bringing about the separation of the closure member and the bottle and thus the accidental opening thereof.

According to one particularly advantageous provision, the present invention also proposes an assembly for packaging and applying a cosmetic product, in particular a product for making up the eyelashes and/or eyebrows or lips, comprising a packaging assembly as defined above and a cosmetic product applicator. The cosmetic product applicator comprises a closure element as described above, also forming a gripping element adapted to be handled by a user in order to apply the cosmetic product contained in the bottle. The applicator furthermore comprises an applicator member adapted to be selectively introduced into and withdrawn from the bottle, and a stem connecting the gripping element to the applicator member. When the applicator member is introduced into the bottle, the stem extends through the wiping orifice, in contact with the wiping member, and in particular with the wiping lip. Such an assembly advantageously forms an independent assembly for packaging and applying a cosmetic product that is usable as such, or a refill adapted to replace a similar assembly that has reached the end of its life and is received inside an outer casing with a particularly high-quality appearance, for example made of metal or plastics material with a metallic finish, and typically comprising a case adapted to house the bottle equipped with its wiping member and a cap adapted to cover the gripping element of the applicator.

Finally, according to another aspect, the invention provides a process for manufacturing a bottle belonging to a packaging assembly as described above, comprising the following steps:

a) creating a tubular parison made of drawn glass extending along a longitudinal axis and defining the side wall of the bottle;

c) carrying out hot deformation in the radial direction of a second end of the tubular parison, at the opposite end from a first end along the longitudinal axis, so as to form the neck of the bottle in the form of a cylindrical portion of circular cross section which has a small diameter compared with the side wall, defines the opening for accessing the interior of the bottle and is connected to said side wall via the shoulder extending in particular in the radial direction;

d) carrying out circular hot deformation in the radial direction of the neck of the bottle, axially between the shoulder and the access opening, so as to form an annular groove in the outer surface of the neck, causing the formation of an annular bulge on the inner surface of the neck. The fact that the glass bottle is made in the form of a tubular bottle made of drawn glass advantageously allows it to be easily shaped, at low cost, by hot shaping a tubular parison.

When the first end of the glass bottle is closed and forms a bottom integral with the side wall and the neck, the process for manufacturing the bottle according to the invention also comprises a step b) of carrying out hot deformation in the radial direction of the first end of the tubular parison, so as to form the bottom of the bottle, said bottom having in particular a hemispherical shape centred on the longitudinal axis.

When the first end of the glass bottle is open and intended to be closed by means of a stopper attached to the bottle via complementary fastening elements provided on the stopper and on the first end of the bottle, the process for manufacturing the bottle according to the invention also comprises a step b') of carrying out hot deformation of the first end of the tubular parison, so as to form the fastening element adapted to cooperate with the complementary fastening element provided on the attached stopper. In particular, the fastening element provided on the first end of the bottle may, for example, be formed by an internal thread adapted to cooperate with an external thread provided on the attached stopper or by a snap-fastening groove adapted to cooperate with a snap-fastening bulge provided on the attached stopper.

Advantageously, steps b), b'), c) and/or d) are carried out simultaneously during a single step of hot deformation of the tubular parison made of drawn glass obtained at the end of step a).

When the neck, and more specifically the outer surface of the neck, has a fastening element adapted to cooperate with a complementary fastening element provided on a closure element typically an external thread provided on an outer surface of the neck of the bottle and adapted to cooperate with an internal thread provided in the closure element, this fastening element, in particular this external thread, is produced in step c) of the process for manufacturing the bottle.

The invention may be understood better from reading the following description, accompanied by non-limiting implementation examples thereof, with reference to the appended drawings, in which:

FIG. 1 shows a view in longitudinal section through an assembly 1 for packaging a cosmetic product, typically a product for making up the eyelashes and/or eyebrows, such as a mascara, a product for making up the lips, such as a lipstick or lip balm, or a lip gloss, or a product for making up the face, such as a foundation or a corrector, also known as a concealer.

Figure 1:
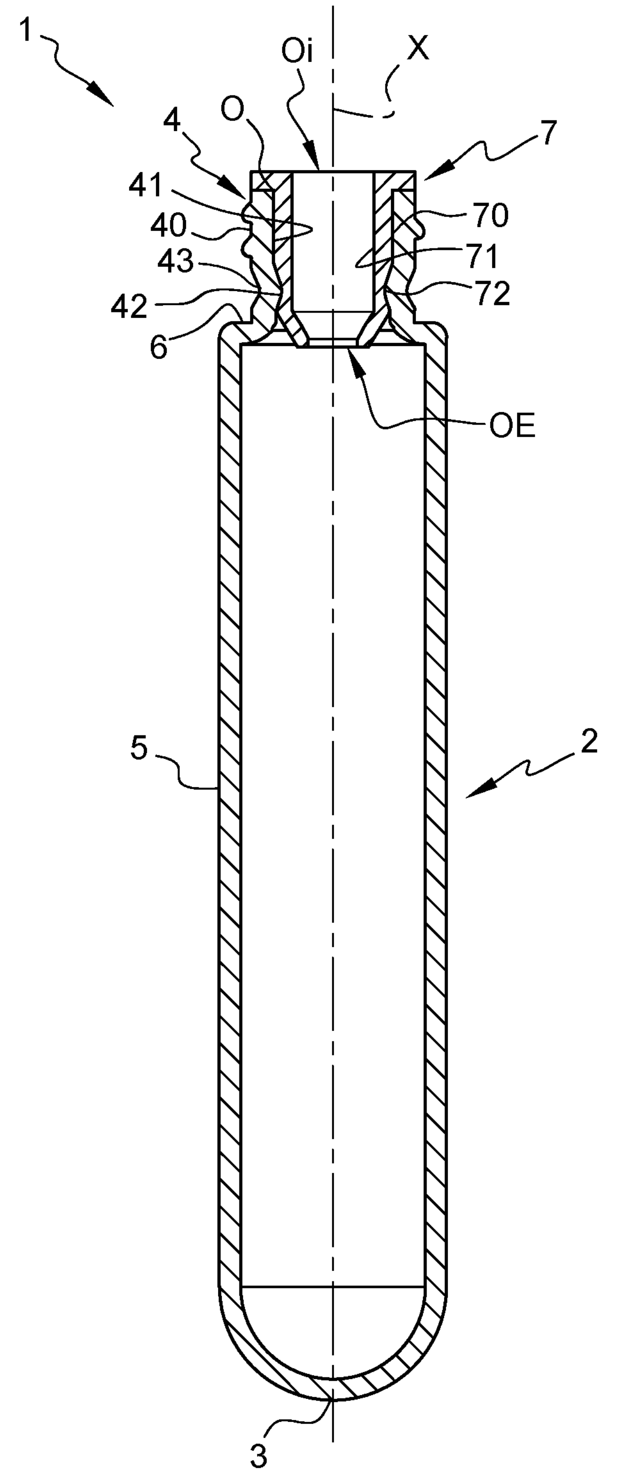
FIG. 1 shows a longitudinal section through an assembly for packaging a cosmetic product according to the invention, implementing a wiping member according to a first embodiment.

The packaging assembly 1 illustrated in this FIG. 1 comprises a tubular bottle 2 made of glass, which is adapted to receive the cosmetic product in the internal space that it defines, and is in the form of an elongate element along a longitudinal axis X. The bottle 2 extends along the longitudinal axis X between a closed bottom 3 and a neck 4 which defines an opening O for accessing the internal space of the bottle 2. A side wall 5 extends between the bottom 3 and the neck 4 of the bottle 2. The side wall 5 of the bottle 2 is connected to the neck 4 via a shoulder 6 which, in the embodiment illustrated, extends substantially in the radial direction, perpendicular to the longitudinal axis X. The bottle 2 advantageously has a wall thickness that is substantially constant along its entire length along the longitudinal axis X.

Figure 6:
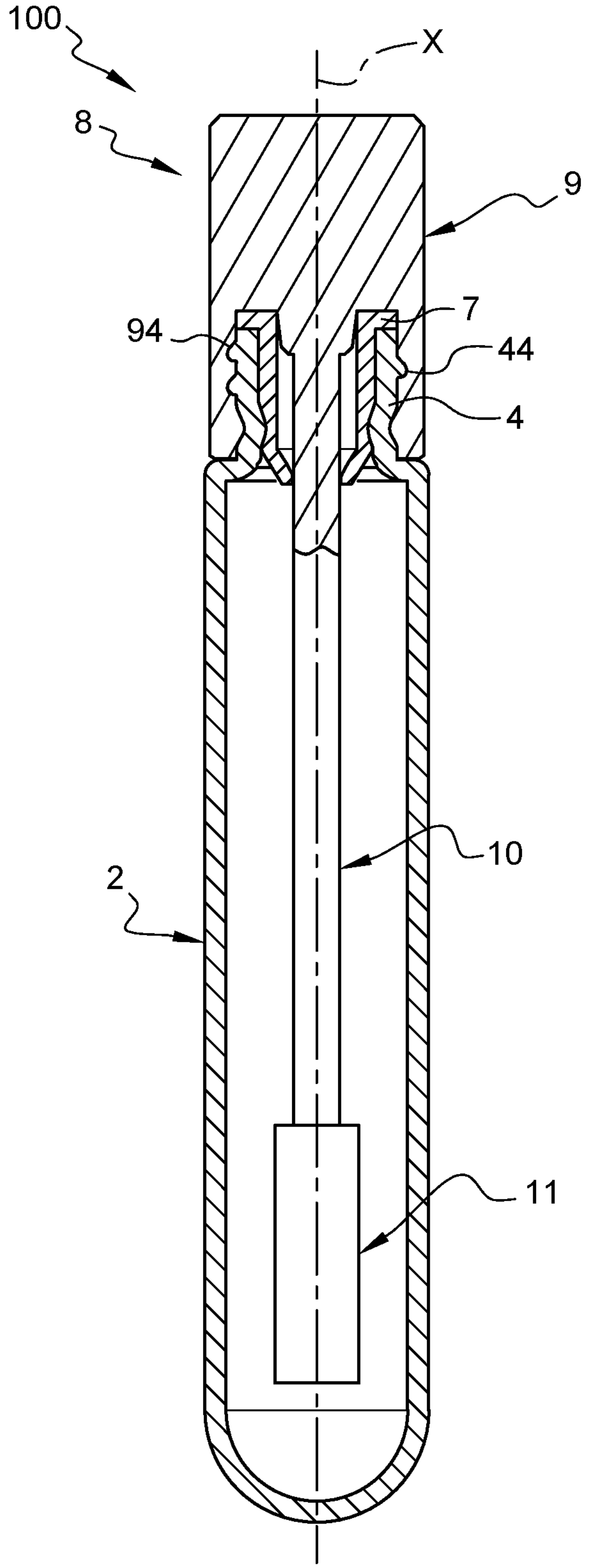
FIG. 6 shows a view in longitudinal section through an assembly for packaging and applying a cosmetic product according to the invention, implementing the packaging assembly illustrated in FIGS. 1 to 4, with which a cosmetic product applicator is combined, illustrated schematically without hatching for reasons of clarity.

In the embodiments illustrated in the figures, and as can be seen in particular in FIGS. 1 and 6, the bottom 3 of the bottle 2 has a substantially hemispherical shape centred on the longitudinal axis X. In a variant, the bottom 3 of the bottle 2 could have a flat shape, extending in a plane perpendicular to the longitudinal axis X, a conical shape centred on the longitudinal axis X or the like. In these illustrated embodiments, the bottom 3 is integral with the side wall 5 and the neck 4 of the bottle.

According to another variant that is not illustrated, the bottle 2 may have an open end at the opposite end from the neck 4 along the longitudinal axis X, this open end being intended to be closed by means of a stopper attached and fastened to the bottle via complementary fastening elements provided on the bottle and the stopper, so as to form the bottom of the bottle.

Furthermore, in the embodiments illustrated, the side wall 5 of the bottle 2 has a cylindrical shape, with a circular cross section. However, the side wall of the bottle could adopt a cylindrical shape with a cross section other than circular, such as a cross section that is rectangular, square, square with rounded edges, a squircle shape, ovoid or the like, without departing from the scope of the present invention. According to another variant, the side wall of the bottle could also adopt a tubular shape other than cylindrical, that is to say the shape of a tube of which the generatrix is not a straight line but, for example, a curve or a succession of segments of straight lines that form angles between one another, so as to obtain a bottle of which the side wall has a shape that is domed, in the form of an ogive, a peanut, an hourglass, a concertina, or the like. Furthermore, the side wall 5 of the bottle 2 may also have decorative reliefs or reliefs intended to make it easier to grip the bottle, such as ridges or waves, extending for example parallel to the longitudinal axis X.

The neck 4 of the bottle 2 has a circular cross section and defines an outer surface 40 and an inner surface 41, opposite to the outer surface 40 in the radial direction. As can be seen in the figures, the outer surface 40 of the neck 4 of the bottle 2 is advantageously provided with fastening elements, in this case an external thread 44, adapted to cooperate with complementary fastening elements, in this instance an internal thread, provided on a closure element intended to be joined to the bottle 2 in order to close the access opening O thereof, preferably in a leaktight manner.

The packaging assembly 1 also comprises a wiping member 7, 7' that is intended to be received inside the neck 4 of the bottle 2 and that defines an introduction orifice OI and a wiping orifice OE. According to known provisions, such a wiping member 7, 7' is advantageously provided when the bottle 2 is intended to be combined with an applicator 8 comprising a gripping element 9, an applicator member 11 and a stem 10 connecting these two elements, as illustrated in FIG. 6, in order in particular to scrape the stem 10 and “wipe” the applicator member 11 when the applicator 8 is withdrawn from the bottle 2, in order to clean the stem 10 and remove excess product loaded on the applicator member 11. In this scenario, illustrated in FIG. 6, the gripping element 9 also forms an element for closing the bottle 2, provided with fastening elements, in this case an internal thread 94, adapted to cooperate with complementary fastening elements, in this case an external thread 44, provided on the outer surface of the neck 4 of the bottle 2. When the applicator member 11 is introduced into the bottle 2, as illustrated in FIG. 6, the stem 10 extends through the wiping orifice OE and is in contact with the wiping member 7.

In a variant, which is not shown, the packaging assembly 1 comprising the bottle 2 and the wiping member 7, 7' may be combined with a closure element forming a simple stopper, which does not have a stem and an applicator member, and is adapted to cooperate with the neck 4 of the bottle 2 in order to close the access opening O thereof.

In one or another of the abovementioned variants, and as can be seen for example in FIG. 6, the outer surface of the closure element 9 is preferably flush with the outer surface of the side wall 5 of the bottle 2 in the radial direction when the closure element 9 closes the opening O of the neck 4 of the bottle 2. Alternatively, however, provision could be made for the outer surface of the closure element 9 to be set back from the outer surface of the side wall 5 of the bottle 2 in the radial direction when the closure element 9 closes the opening O of the neck 4 of the bottle 2.

Figure 3:
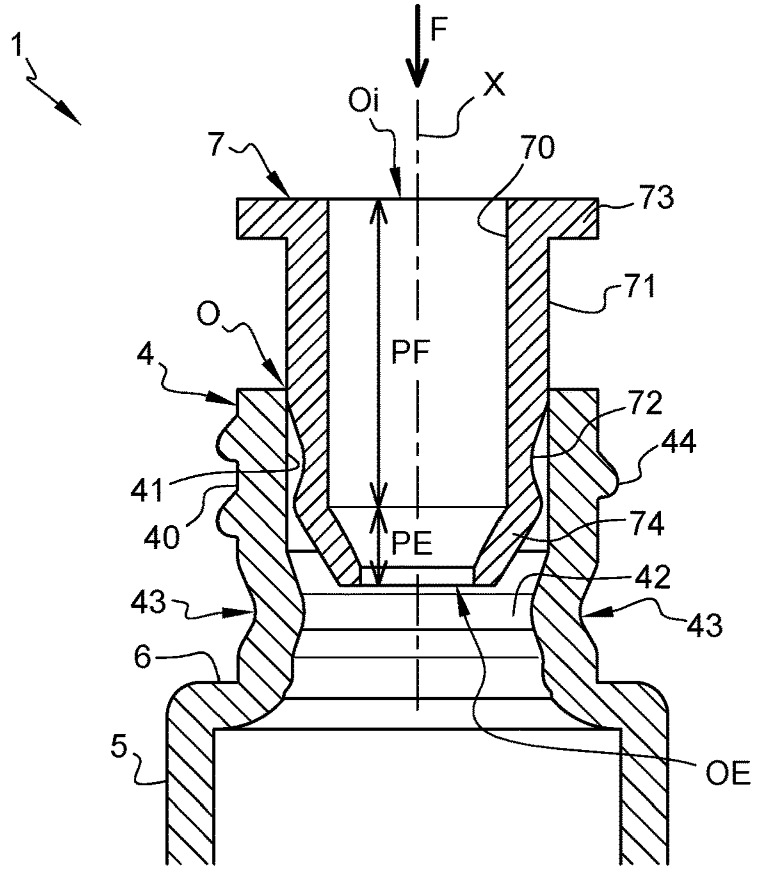
FIG. 3 illustrates an enlarged view of a phase of introducing the wiping member into the neck of the bottle belonging to the packaging assembly illustrated in FIG. 1.
Figure 4:
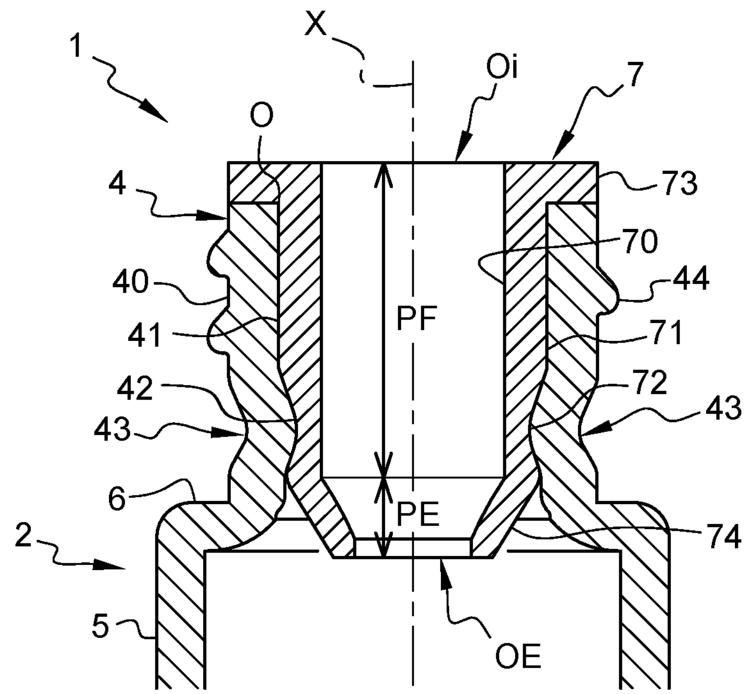
FIG. 4 illustrates an enlarged view of the wiping member fastened in the neck of the bottle belonging to the packaging assembly illustrated in FIG. 1.

As is apparent in particular from FIGS. 3 and 4, the wiping member 7 is in the form of a generally tubular element and comprises a fastening portion PF, provided to fasten the wiping member 7 in the neck 4 of the bottle 2, said portion having a circular cross section and defining an introduction orifice OI for an applicator member 11, and a wiping portion PE that defines a wiping orifice OE on the opposite side from the introduction orifice OI along the longitudinal axis X.

More specifically, and as can be seen in FIGS. 3 and 4, the fastening portion PF of the wiping member 7 has a circular cross section and comprises an inner surface 70 which defines the introduction orifice OI and an outer surface 71 provided for fastening the wiping member 7 inside the neck of the bottle 2.

In the embodiments illustrated, the wiping portion PE of the wiping member 7, 7' has a wiping lip 74 in the form of a cone frustum which extends inwardly in the radial direction and the small base of which defines the wiping orifice OE. In a variant, which is not shown, the wiping lip 74 may also extend substantially along the radial direction and/or have waves about the longitudinal axis X.

According to the invention, the bottle 2 is made of drawn glass, such a bottle structure and such a bottle manufacturing method making it possible to easily produce, at low cost, a bottle that is durable over time and does not use raw materials derived from petrochemicals.

Figure 2:
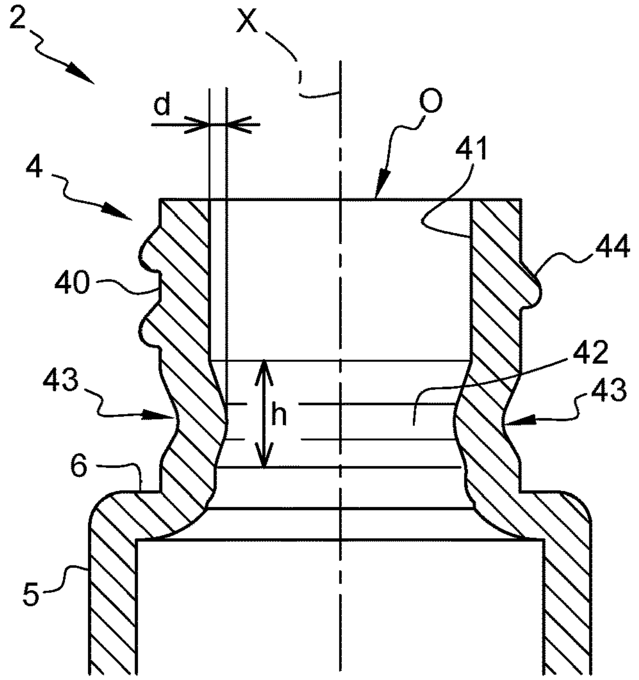
FIG. 2 illustrates an enlarged view of only the neck of the bottle belonging to the packaging assembly illustrated in FIG. 1.

Furthermore, and as can be seen particularly clearly in FIG. 2, the inner surface 41 of the neck 4 of the bottle 2 has an annular bulge 42 that extends inwardly in the radial direction and is obtained by circular deformation about the longitudinal axis X of the outer surface 40 of the neck 4. Such an operation of circular deformation of the outer surface 40 of the neck 4, which causes the formation of the annular bulge 42 on the inner surface 41 of the neck 4, is particularly easy to carry out when the bottle is made of drawn glass, during a step of hot deformation of a tubular bottle parison, as will be described in more detail below.

Figure 5:
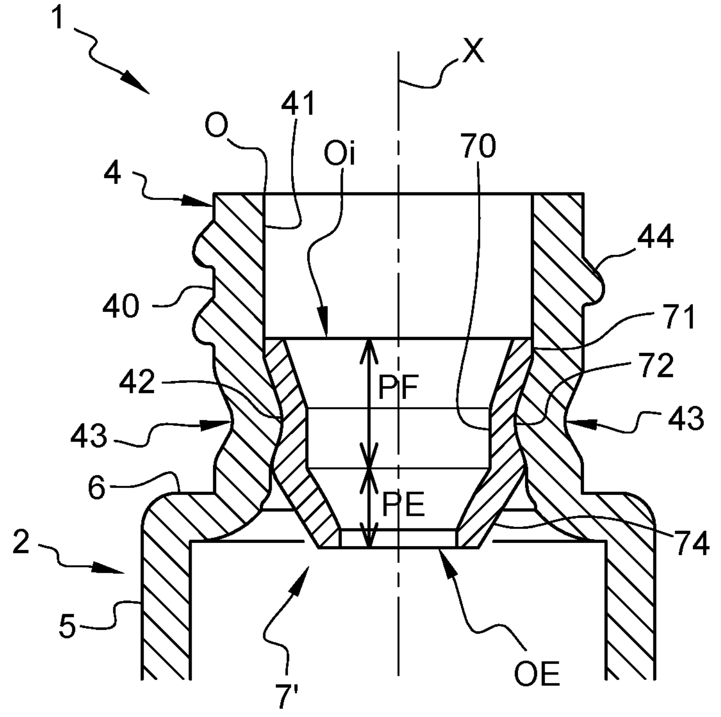
FIG. 5 is a view similar to the one in FIG. 4, in which the assembly for packaging a cosmetic product according to the invention implements a wiping member according to a second embodiment.

As illustrated in particular in FIGS. 3 to 5, the wiping member 7, 7' has, on the outer surface 71 of its fastening portion PF, an annular groove 72 with a shape substantially complementary to that of the annular bulge 42 formed on the inner surface 41 of the neck 4 of the bottle 2.

According to the invention, the annular bulge 42 formed on the inner surface 41 of the neck 4 of the bottle 2 is designed and adapted to cooperate with and be accommodated in the annular groove 72 formed in the outer surface 71 of the fastening portion PF of the wiping member 7, 7' in order to fasten the wiping member 7, 7' inside the neck 4 of the bottle 2 by snap-fastening, or elastic push-fitting. Such snap-fastening makes it possible to keep the wiping member 7, 7' inside the neck 4 of the bottle 2 robustly, reliably and inexpensively.

Advantageously, and as illustrated in particular in FIG. 2, the annular bulge 42 protrudes in the radial direction from the inner surface 41 of the neck 4 of the bottle 2 by a distance d greater than or equal to 0.3 mm, and preferably greater than or equal to 0.4 mm. In the embodiment illustrated, the annular bulge 42 protrudes in the radial direction from the inner surface 41 of the neck 4 by a distance d of around 0.4 mm.

Furthermore, and still with reference to FIG. 2, the annular bulge 42 extends over a height h along the longitudinal axis X greater than or equal to 1 mm, and preferably greater than or equal to 2 mm. In the embodiment illustrated, the annular bulge 42 extends over a height h along the longitudinal axis X of around 2.4 mm.

In the embodiment illustrated in FIGS. 1 to 4 and 6, the fastening portion PF of the wiping member 7 also has a collar 73 bearing on the mouth of the neck 4 of the bottle 2 and defining the introduction orifice OI situated above the opening O of the neck 4 of the bottle 2 along the longitudinal axis X. In other words, the introduction orifice OI protrudes from the opening O of the neck 4 of the bottle 2 along the longitudinal axis X, on the opposite side from the bottom 3 of the bottle 2. This bearing collar 73 makes it possible to reinforce the retention of the wiping member 7 in the neck 4 of the bottle 2 in particular in the direction of insertion of the wiping member in the direction of the bottom 3 of the bottle 2. Furthermore, such a bearing collar 73 may contribute to the tightness of the bottle 2 when the latter is combined with a closure element 9, as illustrated in FIG. 6, a sealing contact being formed between the bearing collar 73 and the closure element 9 when the latter closes the bottle 2.

In a variant, and as illustrated in FIG. 5, the wiping member 7' does not have a collar bearing on the mouth of the neck 4 of the bottle 2 and defines an introduction orifice OI situated below and set back from the opening O of the neck 4 of the bottle 2 along the longitudinal axis X, in the direction of the bottom 3 of the bottle 2.

The present invention also relates to a process for manufacturing a glass bottle implemented within an assembly for packaging a cosmetic product as described above.

The process for manufacturing a glass bottle according to the invention implements a technique of blowing combined with drawing, the general principles of which will be described below; the term drawn glass is then used. In this manufacturing technique, the raw materials are initially weighed, then mixed and wetted. Cullet is then preferably added to this vitrifiable mixture before it is charged continuously into a melting furnace. The cullet is ground glass, for example internal waste materials, the addition of which advantageously makes it possible to lower the melting temperature of the mixture, thereby making the heating step less energy consuming. At the outlet of the furnace, the glass forms a ribbon, which is round onto a mandrel provided with a cooling system and an air blowing system. This mandrel is often inclined slightly with respect to the horizontal and set in rotational movement about its axis. This mandrel typically has a circular cross section in order to give the parison produced a corresponding circular cross section, but may also have a cross section other than circular, such as rectangular, square or ovoid, in order to give the parison produced a corresponding cross section. The glass ribbon is then wound around this mandrel until it forms a large tube which slides slowly over it. At a certain distance from this device, for example around forty metres, a drawing machine (machine provided with two rotating belts which drive the load in its movement generated by the rotation of the mandrel) continuously pulls on this tube which, over this distance, has taken on its final dimensions and reached the solidification temperature. Since the flow rate at the outlet of the furnace, or feeder, given by a calibrated orifice, is constant, it is the speed of the drawing machine and the pressure of the blowing air through the mandrel which gives the glass rod its desired outer radial dimensions, typically its diameter when the tubular parison has a circular cross section, and its desired thickness. Following the drawing machine, a cutting machine delivers the load in portions, the ends of which are recut straight and fire polished on a finishing line, in order to obtain the glass rods, which will be delivered to the conversion glassworks to create the finished products.

Thus, in a first step a) of the process according to the invention, a tubular glass parison made of drawn glass is produced in the form of a tube that is open at its ends, or glass rod, which is typically cylindrical and generally has a circular cross section, but which may also have a cross section other than circular, such as rectangular, square or ovoid, with substantially constant outer radial dimensions, typically a diameter when the tubular parison has a circular cross section, and a substantially constant thickness, extending along a longitudinal axis X and having, optionally after being cut, a desired length along the longitudinal axis X. This tubular parison may, for example, be obtained from a relatively long glass rod, formed continuously, and delivered so as to obtain portions of desired length along the longitudinal axis X. The tubular parison thus obtained may directly define the side wall 5 of the bottle 2, in terms of shape and size. In a variant, this tubular parison may subsequently be reworked so as to confer the desired shape on the side wall of the bottle, as will be described in more detail below.

Following partial cooling or preferably following complete cooling and reheating of the parison thus obtained, steps of shaping by hot deformation or hot shaping of the parison are carried out in order to shape the bottle with the finally desired shape. In particular, these steps of hot deformation of the tubular parison can be carried out, in one or preferably in several passes, by means of a system of wheels, in particular wheels that rotate freely or wheels that are driven in rotation about their axis, and the axis of rotation of which can be set into movement in translation in a direction perpendicular to the longitudinal axis X of the tubular parison, into movement in translation along the longitudinal axis X of the tubular parison and into rotational movement about the longitudinal axis X of the tubular parison, the latter being kept fixed along and about its longitudinal axis X. In a variant, the tubular parison can be set into rotational movement about its longitudinal axis X and the axes of the shaping wheels are set into movement in translation in a direction perpendicular to the longitudinal axis X of the tubular parison and into movement in translation along the longitudinal axis X of the tubular parison. Such a hot deformation method using mobile wheels has the advantage of leaving few traces on the visible outer surface of the finished product obtained. However, other methods for hot shaping a parison in order to obtain the finished bottle can be envisaged, for example techniques implementing shaping shells designed to enclose the tubular parison in order to give it its final outer shape.

Thus, in the embodiment variant in which the bottle 2 has, at its first end, a bottom 3 integral with the side wall 5 of the bottle 2, the process for manufacturing the glass bottle according to the invention comprises a step b) during which hot deformation of a first end of the tubular parison is carried out so as to form the bottom 3 of the bottle 2. In the embodiment illustrated in FIGS. 1 and 6, the bottom 3 has a substantially hemispherical shape centred on the longitudinal axis X. In a variant, however, other shapes for the bottom 3 of the bottle could be envisaged, such as a flat shape, extending in a plane perpendicular to the longitudinal axis X, a conical shape centred on the longitudinal axis X or the like.

In the embodiment variant in which the first end of the glass bottle is open and intended to be closed by means of a stopper attached to the bottle via complementary fastening elements provided on the stopper and on the first end of the bottle, the process for manufacturing the bottle according to the invention comprises a step b') during which hot deformation of the first end of the tubular parison is carried out so as to form the fastening element adapted to cooperate with the complementary fastening element provided on the attached stopper. In particular, the fastening element provided on the first end of the bottle may, for example, be formed by an internal thread adapted to cooperate with an external thread provided on the attached stopper or by a snap-fastening groove adapted to cooperate with a snap-fastening bulge provided on the attached stopper.

The process for manufacturing a glass bottle according to the invention also comprises a step c) during which hot deformation of a second end of the tubular parison, at the opposite end from the first end along the longitudinal axis X, is carried out so as to form the neck 4 of the bottle 2 in the form of a tubular portion with a circular cross section having a smaller diameter than the side wall 5, which defines the access opening O of the bottle 2 and is connected to the side wall 5 via a shoulder 6, the latter extending in particular in the radial direction. Advantageously, during this step c), the external thread 44 is also formed on the neck 4 of the bottle 2.

The process for manufacturing a glass bottle according to the invention lastly comprises a step d) during which circular hot deformation is carried out in the radial direction of the neck 4 of the bottle 2, at an axial abscissa situated between the shoulder 6 and the access opening O, and preferably between the shoulder 6 and the external thread 44 created on the neck 4 of the bottle 2, so as to form an annular groove 43 in the outer surface 40 of the neck 4, causing the formation of an annular bulge 42 on the inner surface 41 of the neck 4.

These above-described steps b) or b') to d) may advantageously be carried out simultaneously, during a single step of hot deformation of the tubular parison made of drawn glass obtained at the end of step a). In a variant, provision may be made for these steps b) or b') to d) to be carried out sequentially, in one order or another, although step d) is preferably carried out simultaneously with step c) or after step c).

Furthermore, during this phase of shaping the bottle, before, after or simultaneously with the above-described steps b) to d), it is also possible to shape the side wall of the bottle such that it adopts a cylindrical shape, in particular with a circular cross section having a desired diameter, optionally different from and in particular smaller than that of the tubular parison obtained at the end of step a). In a variant, during this phase of shaping the tubular parison by hot deformation, it is possible to shape the side wall of the bottle such that it adopts a cylindrical shape, but with a cross section other than circular, for example a cross section that is rectangular, square, square with rounded edges, a squircle shape, ovoid or the like. According to yet another variant, during this phase of shaping the tubular parison by hot deformation, it is possible to shape the side wall of the bottle such that it adopts a tubular shape other than cylindrical, that is to say the shape of a tube of which the generatrix is not a straight line but, for example, a curve or a succession of segments of straight lines that form angles between one another, so as to obtain a bottle of which the side wall has a shape that is domed, in the form of an ogive, a peanut, an hourglass, a concertina, or the like. In addition, during this phase of shaping the tubular parison, it is possible to create reliefs such as ridges or waves, for example parallel to the longitudinal axis X, on the outer surface of the side wall 5 of the bottle 2.

At the end of these steps a) to d), a tubular bottle 2 made of drawn glass is obtained, which is ready to be joined to a wiping member 7.

The wiping member 7 and the bottle 2 belonging to the packaging assembly 1 according to the invention may be joined particularly easily, in particular during automated assembly in the factory, and will be described with reference to FIGS. 2 to 4.

In a first assembly step, illustrated partially in FIG. 2, a tubular bottle 2 made of drawn glass is provided, which is obtained and shaped in particular by means of the process described above.

In a second step, a wiping member 7 having, on the outer surface 71 of its fastening portion PF, an annular groove 72 with a shape substantially complementary to that of the annular bulge 42 formed on the inner surface 41 of the neck 4 of the bottle 2 is provided.

In a third step, illustrated in FIG. 3, the wiping member 7 is positioned in a centred manner on the longitudinal axis X of the bottle 2, with the wiping portion PE, and in this case the wiping lip 74, next to the opening O of the bottle, and a pushing force is applied along the arrow F, shown in this FIG. 3, along the longitudinal axis X and in the direction of the bottom 3 of the bottle 2, in order to insert the wiping member through the opening O of the bottle 2.

On continuing to apply this force applied to the wiping member 7 in the direction of the bottom 3 of the bottle 2, the wiping member 7 is made to deform in the radial direction in contact with the annular bulge 42 formed on the inner surface 41 of the neck 4 of the bottle 2, until the groove 72 present on the outer surface 71 of its fastening portion PF fits over the annular bulge 42 by elastic return, in order to achieve axial retention of the wiping member 7 in the neck 4 of the bottle 2 in both directions along the longitudinal axis X, as shown in FIG. 4. Snap-fastening, or elastic push-fitting, of the wiping member 7 in the neck 4 of the tubular bottle 2 made of drawn glass is achieved, by the cooperation of the annular bulge 42 formed on the inner surface 41 of the neck 4 of the bottle 2 and the annular groove 72 formed in the outer surface 71 of the fastening portion PF of the wiping member 7.

Furthermore, in the embodiment illustrated in FIGS. 1 to 4 and 6, the wiping member 7 is additionally provided with a collar 73 bearing on the mouth of the neck 4 of the bottle 2 when the annular bulge 42 formed on the inner surface 41 of the neck 4 of the bottle 2 is accommodated in the groove 72 present in the outer surface 71 of the fastening portion PF of the wiping member 7.

In the embodiment illustrated in FIG. 5, the wiping member 7' does not have such a bearing collar and the wiping member 7' is hold in the neck 4 of the bottle 2 essentially by the cooperation of the annular bulge 42 formed on the inner surface 41 of the neck 4 of the bottle 2 and the groove 72 present in the outer surface 71 of the fastening portion PF of the wiping member 7'.

Preferably, in one or another of the embodiment illustrated, it is also possible to provide, in addition to the snap-fastening of the annular groove 72 of the wiping member 7, 7', tightened or close contact in the radial direction between the neck 4 of the bottle 2 and the wiping member 7, 7', and in particular between the inner surface 40 of the neck 4 of the bottle 2 and the outer surface 71 of the fastening portion PF of the wiping member 7, 7'. In particular, and as can be seen in FIGS. 4 and 5, tightened contact in the radial direction is advantageously provided between the inner surface 41 of the neck 4 of the bottle 2 and an upper part of the outer surface 71 of the fastening portion PF of the wiping member 7 situated axially between the introduction orifice OI and the annular groove 72. In a variant or in addition, tightened contact in the radial direction may also be provided between the inner surface 41 of the neck 4 of the bottle 2 and a lower part of the outer surface 71 of the fastening portion PF of the wiping member 7, said portion being situated axially between the annular groove 72 and the wiping portion PE. In one particular embodiment, tightened contact in the radial direction is advantageously provided between the inner surface 41 of the neck 4 of the bottle 2 and the upper part of the outer surface 71 of the fastening portion PF of the wiping member 7, said portion being situated axially between the introduction orifice OI and the annular groove 72, and a clearance in the radial direction is left between the inner surface 41 of the neck 4 of the bottle 2 and the lower part of the outer surface 71 of the fastening portion PF of the wiping member 7, said portion being situated axially between the annular groove 72 and the wiping portion PE.

The invention claimed is:

1. A packaging assembly for packaging a cosmetic product, comprising:

- a glass bottle which is adapted to receive a cosmetic product and extends along a longitudinal axis between a first end and a neck defining an opening for accessing the interior of the bottle, said bottle having a side wall extending between said first end and said neck, wherein the side wall is connected to the neck via a shoulder, said neck having a circular cross section and defining a first outer surface and a first inner surface; and
- a wiping member comprising a fastening portion of circular cross section, said fastening portion having a second inner surface defining an introduction orifice and a second outer surface for fastening inside the neck of the bottle, and a wiping portion defining a wiping orifice on the opposite side from the introduction orifice along the longitudinal axis;
- wherein the bottle is made of drawn glass, wherein the first inner surface of the neck of the bottle has a first annular bulge that extends inwardly in a radial direction perpendicular to the longitudinal axis, the first annular bulge being obtained by circular deformation of the first outer surface of said neck so as to form a first annular groove in the first outer surface of the neck and also form the first annular bulge on the first inner surface of the neck, the first annular bulge being configured to cooperate with a second annular groove formed in the second outer surface of the fastening portion of the wiping member in order to ensure that the wiping member is fastened inside the neck by snap-fastening.

2. The packaging assembly according to claim 1, wherein the first annular bulge protrudes in the radial direction from the first inner surface of the neck by a distance greater than or equal to 0.3 mm.

3. The packaging assembly according to claim 1, wherein the first annular bulge extends over a height along the longitudinal axis greater than or equal to 1 mm.

4. The packaging assembly according to claim 1, wherein tightened contact is provided between the wiping member and the neck of the bottle, wherein the contact is provided between the second outer surface of the fastening portion of the wiping member and the first inner surface of the neck of the bottle.

5. The packaging assembly according to claim 1, wherein the fastening portion of the wiping member has a collar bearing on the mouth of the neck of the bottle and defining the introduction orifice situated above the opening of the neck of the bottle along the longitudinal axis.

6. The packaging assembly according to claim 1, wherein the fastening portion of the wiping member does not have a collar bearing on the mouth of the neck of the bottle and defines an introduction orifice situated below the opening of the neck of the bottle along the longitudinal axis.

7. The packaging assembly according to claim 1, wherein the wiping portion of the wiping member has a wiping lip that extends inwardly in the radial direction and defines the wiping orifice, said wiping lip being in the form of a cone frustum, the small base of which defines the wiping orifice.

8. The packaging assembly according to claim 1, further comprising a closing element adapted to cooperate with the neck of the bottle in order to close the opening thereof.

9. The packaging assembly according to claim 8, wherein the neck of the bottle and the closure element are provided with complementary fastening elements.

10. The packaging assembly according to claim 8, wherein, when the closure element closes the opening of the neck of the bottle, the outer surface of said closure element is flush with the outer surface of the side wall of the bottle in the radial direction.

11. An assembly for packaging and applying a cosmetic product, comprising:

- a packaging assembly according to claim 8; and
- a cosmetic product applicator comprising:
  - a closing member forming a gripping member adapted to be handled by the user in order to apply the cosmetic product;
  - an applicator member adapted to be selectively introduced into and withdrawn from the bottle; and
  - a stem connecting the gripping element to the applicator member and extending through the wiping orifice in contact with the wiping member when the applicator member is introduced into the bottle.

12. A process for manufacturing a bottle belonging to a packaging assembly according to claim 1, comprising the following steps:

- a) creating a tubular parison made of drawn glass extending along a longitudinal axis and defining the side wall of the bottle;
- c) carrying out hot deformation in the radial direction of a second end of the tubular parison, at the opposite end from a first end along the longitudinal axis, so as to form the neck of the bottle in the form of a cylindrical portion of circular cross section which has a small diameter compared with the side wall, defines the opening for accessing the interior of the bottle and is connected to said side wall via the shoulder extending in particular in the radial direction;
- d) carrying out circular hot deformation in the radial direction of the neck of the bottle, axially between the shoulder and the access opening, so as to form an annular groove in the outer surface of the neck, causing the formation of an annular bulge on the inner surface of the neck.

13. The packaging assembly of claim 1, wherein the neck of the bottle comprises an external thread.

14. The packaging assembly of claim 13, wherein the annular groove is formed between the shoulder and the external thread.

15. The packaging assembly of claim 9, wherein the complementary fastening elements are an external thread and an internal thread.

* * * * *